US00RE43414E

(19) United States
(12) Reissued Patent
Walters et al.

(10) Patent Number: US RE43,414 E
(45) Date of Reissued Patent: May 29, 2012

(54) SYNTHETIC RIPPLE REGULATOR

(75) Inventors: Michael M. Walters, Apex, NC (US); Vladimir Muratov, Manchester, NH (US); Stefan Wlodzimierz Wiktor, Raleigh, NC (US)

(73) Assignee: Intersil Americas Inc., Milpitas, CA (US)

(21) Appl. No.: 12/255,346

(22) Filed: Oct. 21, 2008

Related U.S. Patent Documents

Reissue of:
(64) Patent No.: 7,132,820
Issued: Nov. 7, 2006
Appl. No.: 10/853,733
Filed: May 25, 2004

U.S. Applications:
(63) Continuation-in-part of application No. 10/236,787, filed on Sep. 6, 2002, now Pat. No. 6,791,306.

(51) Int. Cl.
*G05F 1/40* (2006.01)
(52) U.S. Cl. ..... 323/288; 323/282; 323/285
(58) Field of Classification Search ..... 323/282–288, 323/222, 224, 280; 363/16, 89, 95, 97, 98, 363/132
See application file for complete search history.

(56) References Cited

U.S. PATENT DOCUMENTS

| | | | | |
|---|---|---|---|---|
| 4,413,224 | A | 11/1983 | Krupka et al. | |
| 4,521,726 | A | 6/1985 | Budnik | |
| 4,658,204 | A | 4/1987 | Goodwin | |
| 5,399,958 | A | 3/1995 | Iyoda | |
| 5,514,947 | A * | 5/1996 | Berg | 323/282 |
| 6,064,187 | A * | 5/2000 | Redl et al. | 323/285 |
| 6,147,478 | A * | 11/2000 | Skelton et al. | 323/288 |
| 6,433,525 | B2 | 8/2002 | Muratov et al. | |
| 6,495,995 | B2 | 12/2002 | Groom et al. | |
| 6,583,610 | B2 | 6/2003 | Groom et al. | |
| 7,132,820 | B2 * | 11/2006 | Walters et al. | 323/288 |
| 7,768,246 | B2 | 8/2010 | Huang et al. | |

FOREIGN PATENT DOCUMENTS

| | | | |
|---|---|---|---|
| DE | 3343883 | A1 | 6/1984 |
| DE | 42 06 478 | A1 | 9/1993 |
| EP | 0 650 250 | A1 | 4/1995 |
| EP | 0 883 051 | A1 | 12/1998 |
| EP | 1 703 187 | A2 | 1/2001 |
| FR | 2 610 149 | A1 | 7/1988 |

* cited by examiner

*Primary Examiner* — Rajnikant Patel
(74) *Attorney, Agent, or Firm* — Gary R. Stanford

(57) ABSTRACT

A synthetic ripple regulator including a synthetic ripple voltage generator that generates a synthetic ripple voltage indicative of the ripple current through an output inductor. The regulator uses the synthetically generated ripple voltage to control toggling of a hysteretic comparator for developing the pulse width modulation (PWM) signal that controls switching of the regulator. In a non-limiting implementation, a transconductance amplifier monitors the phase node voltage of the inductor and supplies an inductor voltage-representative current to a ripple capacitor, which produces the synthetic ripple voltage. Using the replicated inductor current for ripple regulation results in low output ripple, input voltage feed forward, and simplified compensation.

38 Claims, 4 Drawing Sheets

SYNTHETIC RIPPLE REGULATOR

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of commonly assigned U.S. patent application Ser. No. 10/236,787, filed on Sep. 6, 2002 now U.S. Pat. No. 6,791,306, which is herein incorporated by reference for all intents and purposes.

BACKGROUND OF THE INVENTION

1. Field of the Invention

The present invention relates to powers supply circuits and related components, and is particularly directed to a DC-DC regulator including a synthetic ripple voltage generator which generates an artificial or synthesized ripple waveform that controls the switching operation of the regulator, reduces output ripple and improves DC accuracy.

2. Description of the Related Art

Electrical power for integrated circuits is typically supplied by one or more direct current (DC) power sources. In a number of applications the circuit may require multiple regulated voltages that are different from he available supply voltage (which may be relatively low e.g., on the order of a few volts or less, particularly where low current consumption is desirable, such as in portable, battery-powered devices). Moreover, in many applications the load current may vary over several orders of magnitude. To address these requirements it has been common practice to employ pulse or ripple-based regulators, such as a hysteresis or 'bang-bang' regulator.

Such a ripple-based DC-DC voltage regulator employs a relatively simple control mechanism and provides a fast response to a load transient. The switching of the ripple regulator is asynchronous, which is advantageous in applications where direct control of the switching edges is desired. For this purpose, a ripple regulator typically employs a hysteresis comparator or the like that controls a gate drive circuit coupled to the control or gate drive inputs of a pair of electronic power switching devices, such as FETs or MOSFETS or the like. The gate drive circuit controllably switches or turns the switching devices on and off in accordance with a pulse width modulation (PWM) switching waveform as known to those skilled in the art.

In such a hysteretic or 'bang-bang' regulator, the output PWM signal waveform produced by hysteresis comparator transitions to a first state (e.g., goes high) when the output voltage falls below a reference voltage minus the comparator's inherent hysteresis voltage and the comparator's PWM output transitions to a second state (e.g., goes low) when the output voltage exceeds the reference voltage plus the hysteresis voltage. The application of or increase in load causes the output voltage to decrease below the reference voltage, in response to which the comparator triggers the gate drive to turn on the upper switching device. Because the regulator is asynchronous, the gate drive control signal does not wait for a synchronizing clock, as is common in most fixed frequency PWM control schemes.

Principal concerns with this type of ripple regulator include large ripple voltage, DC voltage accuracy, and switching frequency. Since the hysteretic comparator directly sets the magnitude of the ripple voltage, employing a smaller hysteresis voltage reduces the power conversion efficiency, as switching frequency increases with smaller hysteresis. In order to control the DC output voltage, which is a function of the ripple wave shape, the peaks and valleys of the output ripple voltage are regulated. The DC value of the output voltage is a function of the PWM duty factor. The output voltage wave shape also changes at light loads, when current through the output inductor becomes discontinuous, producing relatively short 'spikes' between which are relatively long periods of low voltage. Since the ripple voltage wave shape varies with input line and load conditions, maintaining tight DC regulation is difficult.

In addition, improvements in capacitor technology changes the ripple wave shape. In particular, the current state of ceramic capacitor technology has enabled the equivalent series resistance or ESR (which produces the piecewise linear or triangular wave shape of the output voltage waveform) of ceramic capacitors to be reduced to very low values. At very low values of ESR, however, the output voltage's ripple shape changes from triangular to a non-linear shape (e.g., parabolic and sinusoidal). This causes the output voltage to overshoot the hysteretic threshold, and results in higher peak-to-peak ripple. As a result, the very improvements that were intended to lower the output voltage ripple in DC-DC regulators can actually cause increased ripple when used in a ripple regulator.

SUMMARY OF THE INVENTION

A synthetic ripple voltage generator for a DC-DC regulator according to an exemplary embodiment of the present invention includes a transconductance amplifier circuit and a ripple capacitor. The DC-DC regulator includes a hysteretic comparator which develops a pulse width modulation (PWM) signal provided to a switching circuit that switches an input voltage via a phase node through an output inductor to develop an output voltage at an output node. The transconductance amplifier circuit has an input for coupling to the output inductor and an output coupled to the ripple capacitor and for coupling to an input of the hysteretic comparator. In this manner, the transconductance amplifier circuit monitors voltage applied to the output inductor and supplies an inductor voltage-representative current to the ripple capacitor, which produces the synthetic ripple voltage. Using the replicated inductor current for ripple regulation results in low output ripple, input voltage feed forward, and simplified compensation.

The transconductance amplifier circuit may be a single transconductance amplifier having a non-inverting input for coupling to the phase node and an inverting input for coupling to the output node or to a reference voltage. Alternatively, the transconductance amplifier circuit includes first and second transconductor amplifiers and a switch circuit. The first transconductance amplifier has an input for coupling to the output node and an output coupled to the ripple capacitor to discharge the ripple capacitor based on the output voltage. The switch circuit has an input coupled to the output of the second transconductance amplifier, an output coupled to the ripple capacitor, and a control input for receiving the PWM signal. The switch circuit is operative to couple the output of the second transconductance amplifier to charge the ripple capacitor based on the input voltage upon initiation of PWM cycles. The ripple capacitor may be referenced to ground or to the output node. A ripple resistor may be included which is coupled to the ripple capacitor to modify frequency response and/or change bias voltage. The ripple resistor may be referenced to the output voltage or to a voltage source coupled in series with the ripple resistor.

A method of synthetically generating ripple voltage for a DC-DC regulator according to an embodiment of the present invention includes developing a ripple voltage indicative of current through the output inductor, and applying the ripple voltage to an input of the hysteretic comparator. The hysteretic comparator develops a PWM signal provided to a switching circuit that switches an input voltage via a phase node through an output inductor to develop an output voltage at an output node.

The developing a ripple voltage indicative of ripple current through the output inductor may include sensing voltage applied to the output inductor, converting the sensed voltage to a sense current, and charging a capacitive device with the sense current. The sensing voltage applied to the output inductor may include sensing voltage at the phase node. The method may include referencing the capacitive device to the output node or to ground. The method may include coupling a resistive device to the capacitive device. The method may include referencing the resistive device to the output node or biasing the resistive device with a voltage source.

The developing a ripple voltage indicative of ripple current through the output inductor may alternatively include converting the output voltage into a first current, discharging a capacitive device with the first current, converting the input voltage into a second current, and charging the capacitive device with the second current upon initiation of each PWM cycle using the PWM signal.

The developing a ripple voltage indicative of ripple current through the output inductor may alternatively include sensing ripple current through the output inductor and converting the sensed current into the ripple voltage.

A synthetic ripple regulator according to an exemplary embodiment of the present invention includes a hysteretic comparator, a switching circuit, an output inductor, a transconductance amplifier circuit, and a capacitor. The hysteretic comparator has an output that provides a PWM signal and the switching circuit alternately couples a phase node to opposite polarities of an input voltage source based on the PWM signal. The output inductor is coupled between the phase node and an output node that develops a regulated output signal. The transconductance amplifier circuit has an input coupled to the output inductor and an output coupled to an input of the hysteretic comparator. The capacitor is coupled to the output of the transconductance amplifier and develops a ripple voltage indicative of current through the output inductor.

The transconductance amplifier circuit may be a single transconductance amplifier having a differential input coupled across the output inductor or coupled between the phase node and a reference voltage. Alternatively, the transconductance amplifier circuit includes first and second transconductance amplifiers and a switch. The first transconductance amplifier that discharges the capacitor based on the regulated output signal. The switch couples the second transconductance amplifier to the capacitor based on the PWM signal to charge the capacitor based on input voltage during portions of PWM cycles.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
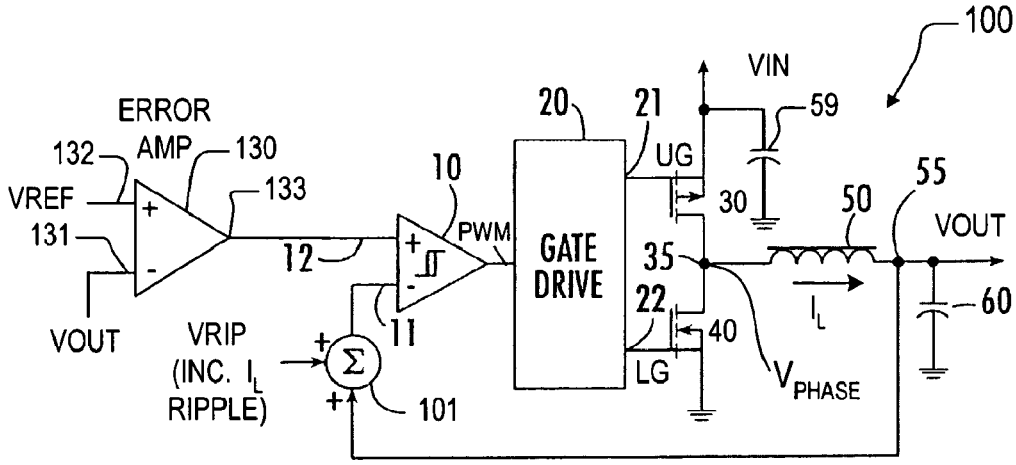
FIG. 1 is a schematic diagram of a synthetic ripple regulator implemented according to an exemplary embodiment of the present invention including a summation unit that adds a synthetic ripple voltage in the feedback control path.

FIG. 1 is a schematic diagram of a synthetic ripple regulator 100 implemented according to an exemplary embodiment of the present invention including a summation unit 101 that adds a synthetic ripple voltage VRIP in the feedback control path. The synthetic ripple regulator 100 employs a hysteresis comparator 10 that controls a gate drive circuit 20 with respective output drive ports 21 and 22. The drive ports 21 and 22 are coupled to the control or gate drive inputs of a pair of electronic power switching devices, respectively shown as an upper P-MOSFET (or PFET) device 30 and a lower N-MOSFET (or NFET) device 40. The switching devices 30 and 40 have their drain-source paths coupled in series between first and second reference voltages, such as an input voltage VIN and ground (GIN). An input filter capacitor 59 is coupled between VIN and GIN. The gate drive circuit 20 controllably switches or turns the two switching devices 30 and 40 on and off in accordance with a pulse width modulation (PWM) switching waveform supplied by comparator 10. The upper switching device 30 is turned on and off by an upper gate switching signal UG applied by the gate driver 20 and the switching device 40 is turned on and off by a lower gate switching signal LG applied by the gate driver 20.

A common or phase voltage node 35 between the two switching devices 30 and 40 develops a phase voltage VPHASE and is coupled to one end of an output inductor 50, having its other end coupled to an output node 55 developing an output signal VOUT. The output node 55 is coupled to an output capacitor 60 referenced to a prescribed reference potential, such as GIN. The output node 55 is coupled to an input of the summation unit 101, which receives an auxiliary ripple voltage VRIP at it other input. The summation unit 101 adds VRIP to VOUT in the feedback path and provides the result to the inverting (−) input 11 of the hysteretic comparator 10. The output node 55 is further coupled to the inverting (−) input 131 of an error amplifier 130. The error amplifier 130 has its non-inverting (+) input 132 coupled to receive a DC reference voltage VREF, and has its output 133 coupled to the non-inverting (+) input 12 of hysteresis comparator 10. In the illustrated embodiments, VREF has a voltage representative of the voltage of VOUT under little or no load conditions. The error amplifier 130 serves to increase the DC regulation accuracy, providing high DC gain to reduce errors due to ripple wave shape, various offsets, and other errors. The error amplifier 130 operates as an integrator that generates an error reference voltage provided to the non-inverting input 12 of hysteresis comparator 10.

The summation unit 101 injects the auxiliary ripple voltage VRIP into the feedback path to input 11 of the hysteretic comparator 10, so as to be combined with the VOUT signal at node 55. VRIP may be generated by many methods, including an independent, clock-generated signal sufficient to provide the desired regulation of the regulator 100. In one embodiment, VRIP is synchronized to the switching intervals of the regulator 100 and has a shape corresponding to, or otherwise indicative of, the inductor current $I_L$ through the output inductor 50. The inductor current $I_L$ includes a ripple current, which, in the present example, is a triangular wave shaped ripple current. The inductor current $I_L$ may also include a DC component. Many methods are known for sensing the current $I_L$ through the output inductor 50 and converting the sensed current into a proportional voltage for generating the VRIP signal, such as a current sensor and current to voltage converter. In one embodiment, VRIP is proportional to $I_L$ including its AC and DC components. Alternatively, VRIP follows only the output inductor ripple current without the DC component of $I_L$. In any event, VRIP is, or otherwise incorporates, a ripple voltage indicative of the ripple current through the output inductor 50. VRIP may also include a separate DC or offset voltage component in the various embodiments.

It is noted that the ripple portion of the inductor current $I_L$ through the inductor 50 is related to, but not the same as, the output voltage ripple of the VOUT signal at node 55. The output voltage ripple depends on many factors, including, for example, the type and configuration of the output capacitor 60. If the capacitor 60 is a ceramic capacitor, for example, the output ripple voltage may be very low especially in low-load conditions, which would otherwise cause regulation difficulty at the comparator 10. The comparator 10 operates best with a ripple voltage having a sufficient magnitude relative to the hysteresis voltage difference of the comparator 10 and which has relatively clean or sharp transitions (e.g., peaks and valleys). Synthetically generating the ripple voltage VRIP based on $I_L$ and adding to the feedback loop of the comparator 10 provides a ripple signal suitable for regulation and that is naturally synchronized to the switching intervals of the regulator 100.

Figure 2:
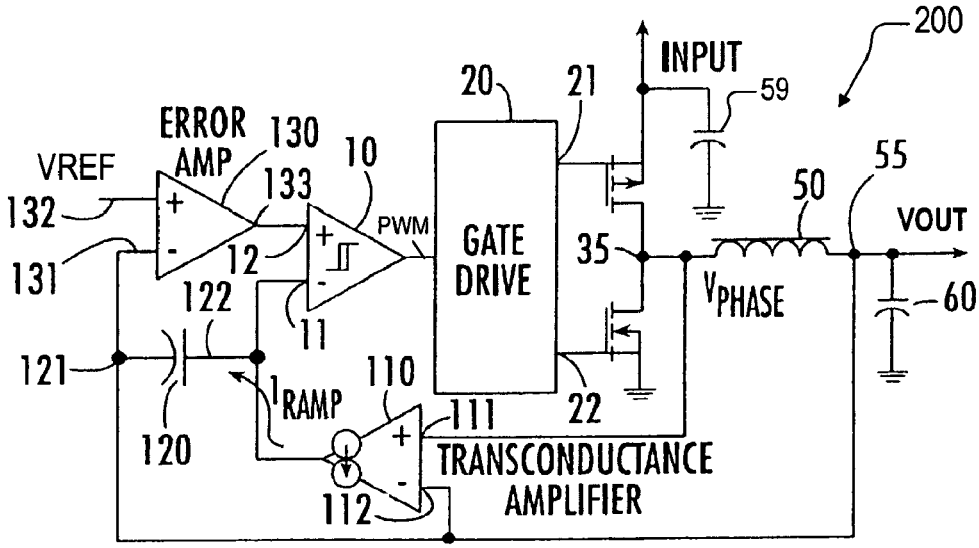
FIG. 2 is a schematic diagram of a synthetic ripple regulator including an exemplary implementation of a synthetic ripple voltage generator including a transconductance amplifier.

FIG. 2 is a schematic diagram of a synthetic ripple regulator 200 including an exemplary implementation of a synthetic ripple voltage generator including a transconductance amplifier 110. Similar components as those for the regulator 100 are shown with the same reference numbers. The output of the transconductance amplifier 110 is coupled to one terminal 122 of a ripple capacitor 120 and to the inverting input 11 of the comparator 10. The transconductance amplifier 110 has its non-inverting (+) input 111 coupled to the phase node 35 and its inverting (−) input 112 coupled to the output voltage node 55. The output node 55 is further coupled to another terminal 121 of the capacitor 120 and to the inverting (−) input 131 of the error amplifier 130.

In this manner, the transconductance amplifier 110 produces an output current $I_{RAMP}$ based on or otherwise proportional to the voltage across the inductor 50. The ripple voltage capacitor 120 transforms the $I_{RAMP}$ current into an inductor current-representative voltage having the desired waveform shape. At least one benefit of synthesizing the ripple waveform based on the inductor current $I_L$ is the inherent feedforward characteristic. For a step input voltage change of VIN, the current $I_{RAMP}$ changes accordingly to modify the conduction interval of the power switching devices 30 and 40. As described in the prior disclosure, the ripple voltage generated across the ripple voltage capacitor 120 is substantially similar in form and frequency with the current through inductor 50. The amount of ripple at the output is relatively small during large load current transients, which also causes corresponding changes in switching frequency as described in the prior disclosure.

Figure 3:
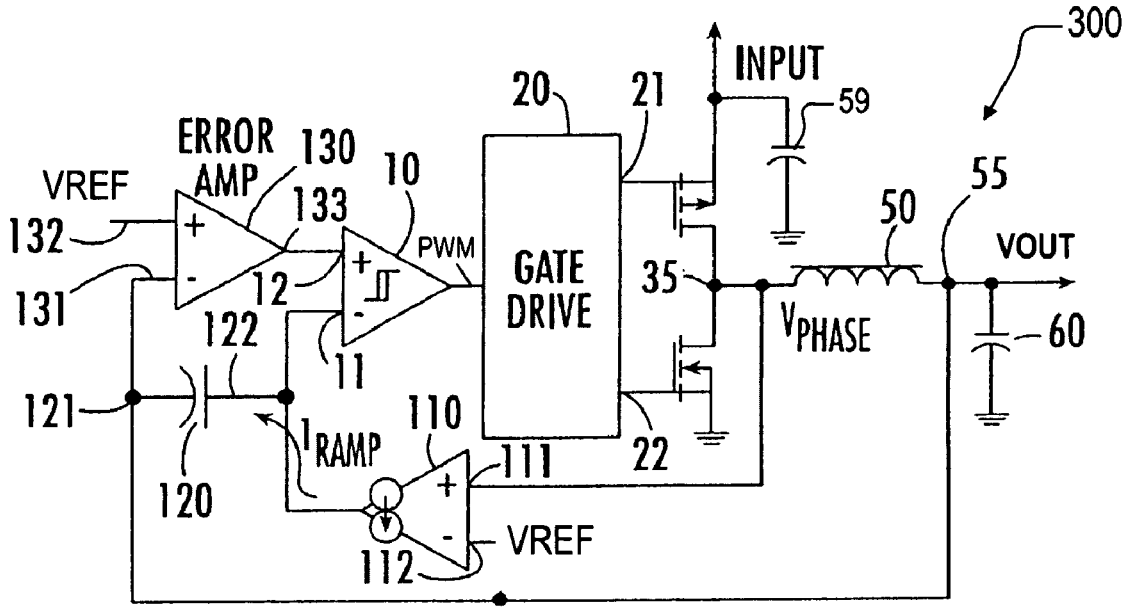
FIG. 3 is a schematic diagram of a synthetic ripple regulator including another exemplary implementation of a synthetic ripple voltage generator in which the transconductance amplifier of FIG. 2 is coupled to a reference voltage.

FIG. 3 is a schematic diagram of a synthetic ripple regulator 300 including another exemplary implementation of a synthetic ripple voltage generator in which the transconductance amplifier 110 receiving the reference voltage VREF. Similar components as those for the regulators 100 and 200 are shown with the same reference numbers. The regulator 300 is substantially similar to the regulator 200 except that the inverting input 112 of the transconductance amplifier 110 is coupled to VREF instead of VOUT. The connection to VOUT in the regulator 200 results in relatively fast feedback in response to changes in VOUT which may be unstable in certain configurations. VREF is constant and does not change so that the VOUT feedback response characteristic at the input of transconductance amplifier 110 is eliminated for the regulator 300.

Figure 4:
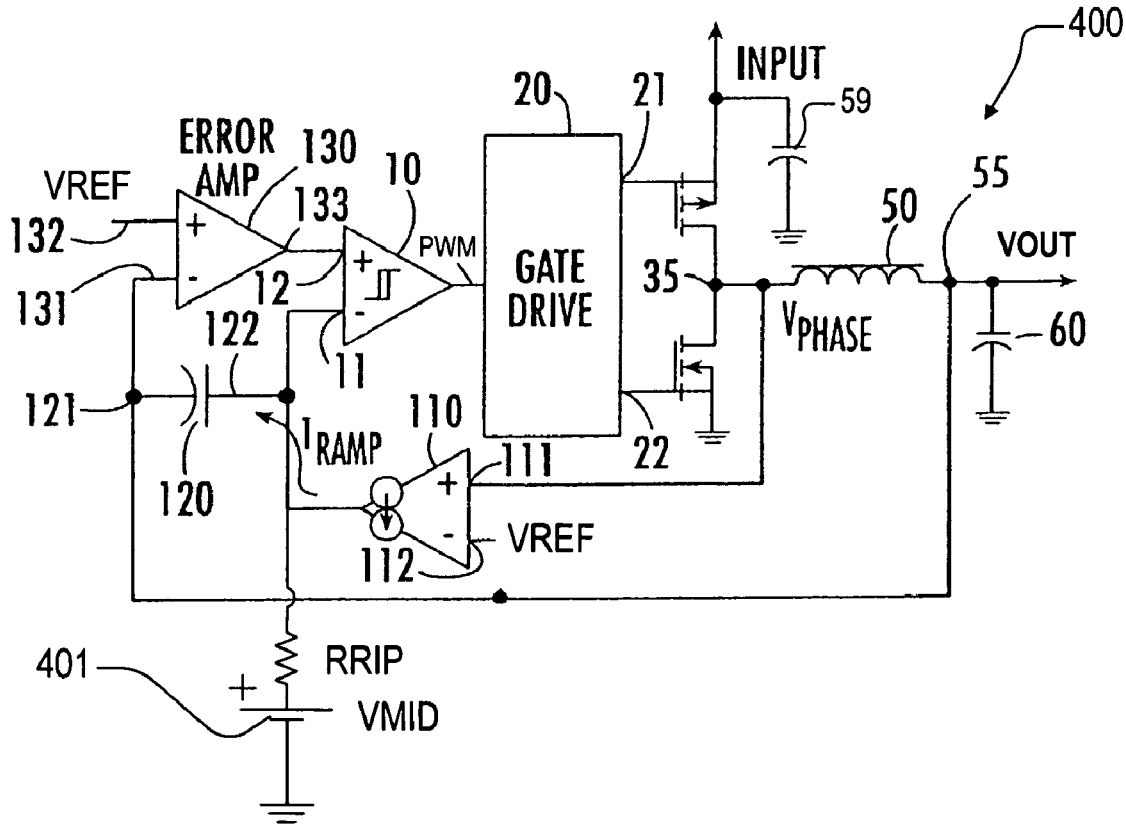
FIG. 4 is a schematic diagram of a synthetic ripple regulator including another exemplary implementation of a synthetic ripple voltage generator including a ripple resistor and a voltage source.

FIG. 4 is a schematic diagram of a synthetic ripple regulator 400 including another exemplary implementation of a synthetic ripple voltage generator including a ripple resistor and a voltage supply 401. The regulator 400 is substantially similar to the regulator 300 in which similar components assume the same reference numbers. In this case, a ripple resistor RRIP has one end coupled to the output of the transconductance amplifier 110 and another end coupled to the positive terminal of the voltage source 401, having its negative terminal coupled to GIN. The voltage source 401 develops a mid-supply voltage VMID. The voltage of VMID is based on the supply voltage for digital logic. In one embodiment, for example, the supply voltage is 5V and VMID is approximately 1.5V. The voltage across the inductor 50 includes a DC voltage level, due at least in part to its inherent DCR, which otherwise continuously charges the capacitor 120 so that its voltage rises over time. The resistor RRIP provides compensation or otherwise modifies frequency response by discharging the capacitor 120 at the appropriate rate to prevent charge build-up. Also, in certain embodiments, the DC voltage on the capacitor may go too high and/or too low, so that it is biased to the mid-supply voltage VMID via the relatively large resistor RRIP. The RC time constant of the ripple capacitor 120 and the resistor RRIP creates a "zero" in the transfer function of the regulator 400. The effect of the zero is taken into account when selecting the specific component values to make the regulation loop stable.

Figure 5:
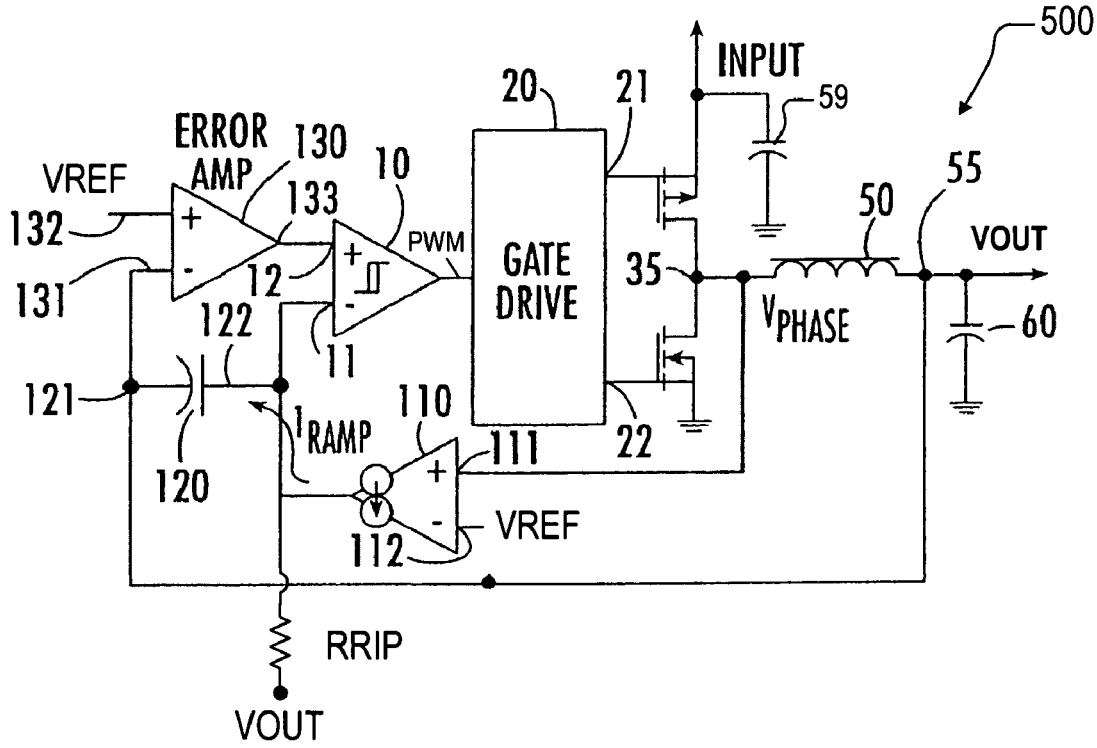
FIG. 5 is a schematic diagram of a synthetic ripple regulator including another exemplary implementation of a synthetic ripple voltage generator including a ripple resistor referenced to the output voltage.

FIG. 5 is a schematic diagram of a synthetic ripple regulator 500 including another exemplary implementation of a synthetic ripple voltage generator including the ripple resistor RRIP referenced to VOUT. The regulator 500 is substantially similar to the regulator 400 in which similar components assume the same reference numbers. In this case, RRIP is provided and coupled between the output of the transconductance amplifier 110 and VOUT. The ripple resistor RRIP provides a similar function as previously described. Compensation is potentially improved when referencing RRIP to VOUT in certain configurations.

Figure 6:
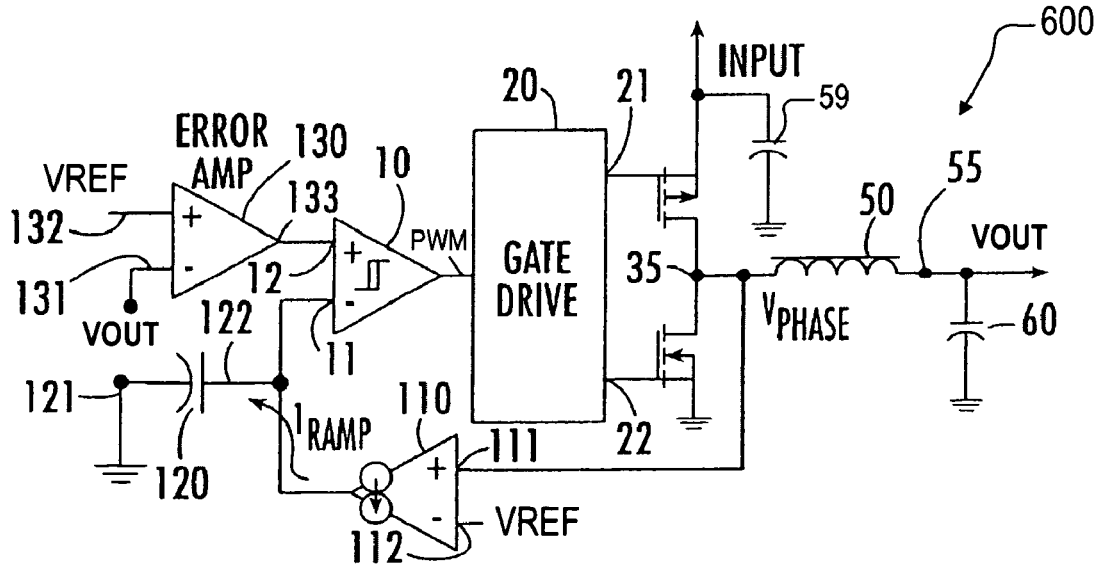
FIG. 6 is a schematic diagram of a synthetic ripple regulator including another exemplary implementation of a synthetic ripple voltage generator in which the ripple capacitor is referenced to a common reference voltage.

FIG. 6 is a schematic diagram of a synthetic ripple regulator 600 including another exemplary implementation of a synthetic ripple voltage generator in which the ripple capacitor 120 is referenced to a common reference voltage (e.g., GIN). The regulator 600 is substantially similar to the regulator 300 in which similar components assume the same reference numbers. In this case, the terminal 121 of the capacitor 120 is coupled to a common reference voltage, such as GIN, rather than to VOUT. The regulator 600 provides additional stability by eliminating the almost immediate feedback connection to VOUT, at the cost of reduced responsiveness to step transitions of VOUT.

Figure 7:
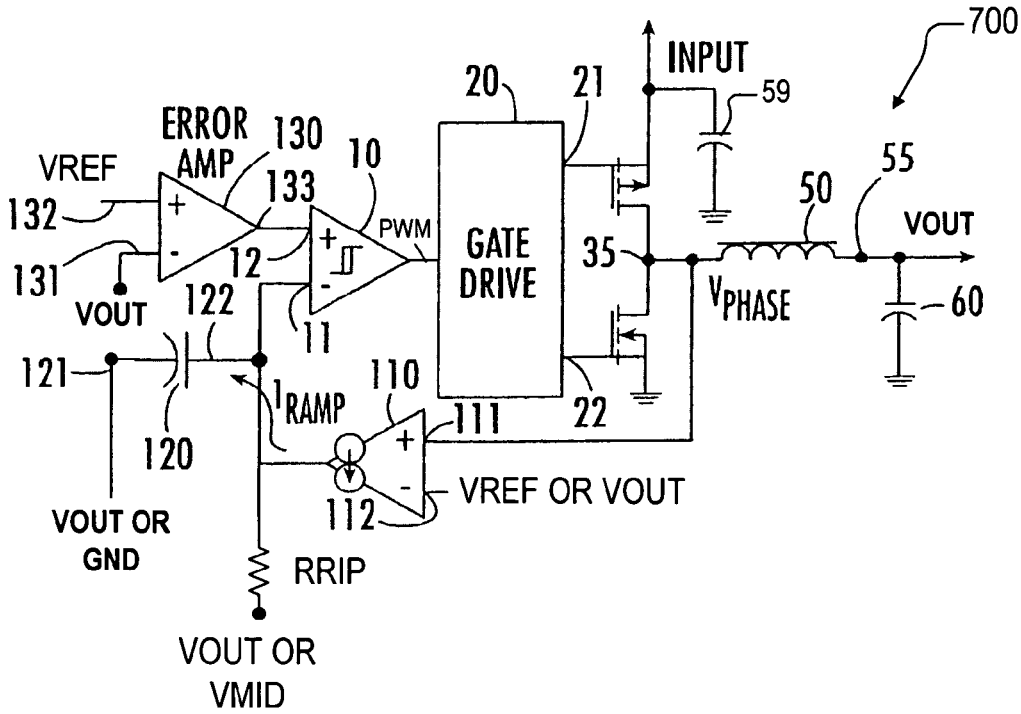
FIG. 7 is a schematic diagram of another synthetic ripple regulator illustrating that any one or more of the variations of the regulators of FIGS. 2-6 may be applied in any combination as appreciated by those of ordinary skill in the art

FIG. 7 is a schematic diagram of a synthetic ripple regulator 700 illustrating that any one or more of the variations of the regulators 200-600 may be applied in any combination as appreciated by those of ordinary skill in the art. Again, similar components assume identical reference numbers. As illustrated, the inverting input of the transconductance amplifier 110 is either coupled to VREF or VOUT, the terminal 121 of the capacitor 120 is either coupled to VOUT or GIN, and the optional resistor RRIP is referenced to either VOUT or VMID. Thus, any combination of the described variations is contemplated.

Figure 8:
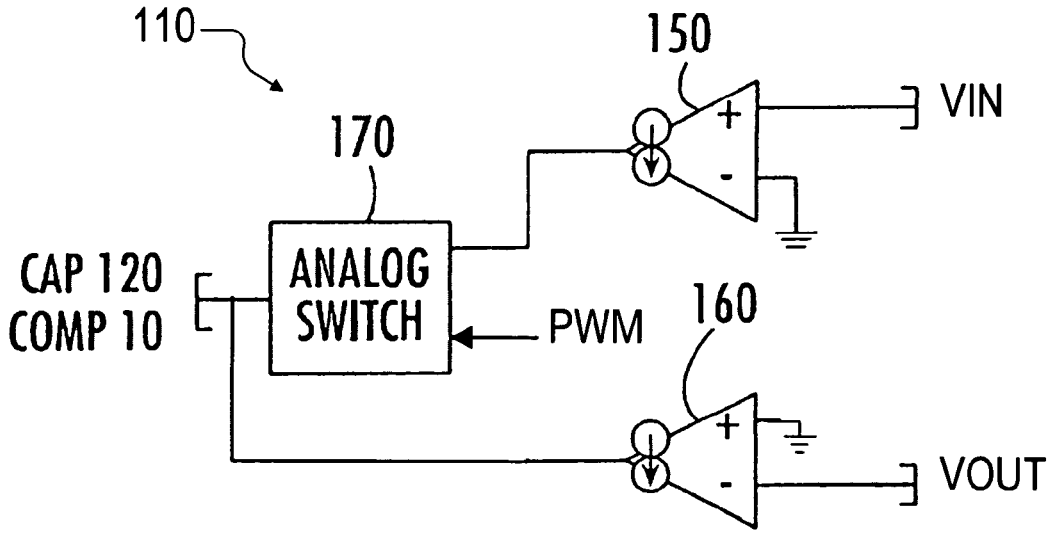
FIG. 8 is a schematic and block diagram illustrating an alternative embodiment of the transconductance amplifier of FIGS. 2-7 including two transconductance amplifiers generating current based on the input and output voltages, respectively.

FIG. 8 is a schematic and block diagram illustrating an alternative embodiment of the transconductance amplifier 110. In this case, the functionality of transconductance amplifier 110 is implemented as two independently controlled transconductance amplifiers 150 and 160 and an analog switch 170 receiving the PWM signal. As illustrated, the transconductance amplifier 150 has its non-inverting input receiving VIN and its inverting input coupled to GIN, while the transconductance amplifier 160 has its inverting input receiving VOUT and its non-inverting input coupled to GND. The output of the amplifier 150 is selectively switched through the analog switch 170 to capacitor 120 and the inverting (−) input 11 of the hysteretic comparator 10. This alternative configuration allows the ramp current to be more precisely controlled for improved linearity.

In operation, the transconductance amplifier 160 continuously discharges the capacitor 120 at a rate based on the voltage level of VOUT and the transconductance amplifier 150 charges the capacitor 120 at a rate based on VIN when coupled to the capacitor 120 via the analog switch 170. In the simplified embodiment illustrated, the analog switch 170 is responsive to the PWM signal to couple the output of the transconductance amplifier 150 to the capacitor 120 at the beginning of the PWM cycle when the PWM signal is asserted high. Since VIN is typically significantly larger than VOUT and since the analog switch 170 switches relatively quickly, the capacitor 120 is quickly charged without the potential delays otherwise associated with the phase node 35. The analog switch 170 decouples the transconductance amplifier 150 from the capacitor 120 in response to PWM going low.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claim(s).

The invention claimed is:

1. A synthetic ripple voltage generator for a DC-DC regulator having a hysteretic comparator that develops a pulse width modulation (PWM) signal provided to a switching circuit that switches an input voltage via a phase node through an output inductor to develop an output voltage at an output node, said synthetic ripple voltage generator comprising:

a transconductance amplifier circuit having an input for coupling to the output inductor and an output for coupling to an input of the hysteretic comparator; and a ripple capacitor coupled to said output of said transconductance amplifier circuit;

wherein said transconductance amplifier circuit provides current to said ripple capacitor which develops a voltage indicative of ripple current through the output inductor.

2. The synthetic ripple voltage generator of claim 1, wherein said transconductance amplifier circuit comprises a transconductance amplifier having a non-inverting input for coupling to the phase node and an inverting input for coupling to the output node.

3. The synthetic ripple voltage generator of claim 1, wherein said transconductance amplifier circuit comprises a transconductance amplifier having a non-inverting input for coupling to the phase node and an inverting input for coupling to a reference voltage.

4. The synthetic ripple voltage generator of claim 1, wherein said ripple capacitor has a first end coupled to said output of said transconductance amplifier circuit and a second end for coupling to the output node.

5. The synthetic ripple voltage generator of claim 1, wherein said ripple capacitor has a first end coupled to said output of said transconductance amplifier circuit and a second end coupled to ground.

6. The synthetic ripple voltage generator of claim 1, further comprising a ripple resistor coupled to said ripple capacitor.

7. The synthetic ripple voltage generator of claim 6, further comprising:

a voltage source referenced to ground; and said ripple resistor having a first end coupled to said ripple capacitor and a second end coupled to said voltage source.

8. The synthetic ripple voltage generator of claim 6, wherein said ripple resistor has a first end coupled to said ripple capacitor and a second end for coupling to the output node.

9. The synthetic ripple voltage generator of claim 1, wherein said transconductance amplifier circuit comprises:

a first transconductance amplifier having an input for coupling to the output node and an output coupled to said ripple capacitor to discharge said ripple capacitor based on the output voltage;

a second transconductance amplifier having an input for receiving the input voltage and an output; and a switch circuit, having an input coupled to said output of said second transconductance amplifier, an output coupled to said ripple capacitor, and a control input for receiving the PWM signal, said switch circuit operative to couple said output of said second transconductance amplifier to said ripple capacitor to charge said ripple capacitor based on the input voltage upon initiation of PWM cycles.

10. A method of synthetically generating ripple voltage for a DC-DC regulator including a hysteretic comparator that develops a pulse width modulation (PWM) signal provided to a switching circuit that switches an input voltage via a phase node through an output inductor to develop an output voltage at an output node, said method comprising:

developing a ripple voltage indicative of current through the output inductor; and applying the ripple voltage to an input of the hysteretic comparator.

11. The method of claim 10, wherein said developing a ripple voltage indicative of current through the output inductor comprises:

sensing voltage applied to the output inductor;

converting the sensed voltage to a sense current; and charging a capacitive device with the sense current.

12. The method of claim 11, wherein said sensing voltage applied to the output inductor comprises sensing voltage at the phase node.

13. The method of claim 11, further comprising referencing the capacitive device to the output node.

14. The method of claim 11, further comprising referencing the capacitive device to ground.

15. The method of claim 11, further comprising coupling a resistive device to the capacitive device.

16. The method of claim 15, further comprising referencing the resistive device to the output node.

17. The method of claim 15, further comprising biasing the resistive device with a voltage source.

18. The method of claim 10, wherein said developing a ripple voltage indicative of current through the output inductor comprises:

converting the output voltage into a first current;

discharging a capacitive device with the first current;

converting the input voltage into a second current; and charging the capacitive device with the second current upon initiation of each PWM cycle using the PWM signal.

19. The method of claim 10, wherein said developing a ripple voltage indicative of ripple current through the output inductor comprises:

sensing ripple current through the output inductor, and converting sensed current into the ripple voltage.

20. A synthetic ripple regulator, comprising:

a hysteretic comparator having a first input and having an output that provides a pulse width modulation (PWM) signal;

a switching circuit that alternately couples a phase node to opposite polarities of an input voltage source based on said PWM signal;

an output inductor coupled between said phase node and an output node that develops a regulated output signal;

a transconductance amplifier circuit having an input coupled to said output inductor and an output coupled to said first input of said hysteretic comparator; and a capacitor, coupled to said output of said transconductance amplifier circuit, that develops a ripple voltage indicative of ripple current through said output inductor.

21. The synthetic ripple regulator of claim 20, further comprising an error amplifier having a first input receiving a reference voltage, a second input coupled to said output node, and an output coupled to a second input of said hysteretic comparator.

22. The synthetic ripple regulator of claim 20, wherein said transconductance amplifier circuit comprises a transconductor amplifier having a first input coupled to said phase node and a second input coupled to said output node.

23. The synthetic ripple regulator of claim 20, wherein said transconductance amplifier circuit comprises a transconductor amplifier having a first input coupled to said phase node and a second input coupled to a reference voltage.

24. The synthetic ripple regulator of claim 20, wherein said capacitor has a first end coupled to said output of said transconductance amplifier circuit and a second end coupled to said output node.

25. The synthetic ripple regulator of claim 20, wherein said capacitor has a first end coupled to said output of said transconductance amplifier circuit and a second end coupled to ground.

26. The synthetic ripple regulator of claim 20, further comprising:

a resistive device having a first end coupled to said output of said transconductance amplifier circuit and a second end; and a voltage source coupled between said second end of said resistive device and ground.

27. The synthetic ripple regulator of claim 20, further comprising a resistive device having a first end coupled to said output of said transconductance amplifier circuit and a second end coupled to said output node.

28. The synthetic ripple regulator of claim 20, wherein said transconductance amplifier circuit comprises:

a first transconductance amplifier having an input coupled to said output node and an output coupled to said capacitor to discharge said capacitor based on said regulated output signal;

a second transconductance amplifier having an input coupled to said input voltage source and an output; and a switch that couples said output of said second transconductance amplifier to said capacitor based on said PWM signal to charge said capacitor based on input voltage during portions of PWM cycles.

*29. A synthetic ripple voltage generator for a DC-DC regulator having a hysteretic comparator that develops a pulse width modulation signal provided to a switching circuit that controls switching of voltage across an output inductor which is coupled to an output node developing an output voltage, said synthetic ripple voltage generator comprising:*

*a transconductance amplifier circuit having an input for coupling to the output inductor and an output for coupling to an input of the hysteretic comparator; and*

*a ripple capacitor coupled to said output of said transconductance amplifier circuit;*

*wherein said transconductance amplifier circuit provides current to said ripple capacitor which develops a voltage indicative of tipple current through the output inductor.*

*30. The synthetic ripple voltage generator of claim 29, wherein said transconductance amplifier circuit comprises a transconductance amplifier having a pair of inputs for coupling across the output inductor.*

*31. The synthetic ripple voltage generator of claim 29, wherein said tipple capacitor has a first end coupled to said output of said transconductance amplifier circuit and a second end for coupling to either one of the output node and ground.*

*32. The synthetic ripple voltage generator of claim 29, further comprising a ripple resistor having one end coupled to said ripple capacitor and another end coupled to either one of the output node and a voltage source providing a constant voltage level.*

*33. A method of synthetically generating ripple voltage for a DC-DC regulator including a hysteretic comparator that develops a pulse width modulation signal provided to a switching circuit that controls switching of voltage applied to an output inductor coupled to an output node which develops an output voltage, said method comprising: developing a ripple voltage indicative of current through the output inductor; and applying the ripple voltage to an input of the hysteretic comparator.*

*34. The method of claim 33, wherein said developing a ripple voltage indicative of current through the output inductor comprises: sensing voltage applied to the output inductor; converting the sensed voltage to a sense current; and charging a capacitive device with the sense current.*

*35. The method of claim 33, wherein said sensing voltage applied to the output inductor comprises sensing voltage at the input node.*

*36. The method of claim 33, wherein said sensing voltage applied to the output inductor comprises sensing voltage across the output inductor.*

*37. The method of claim 33, further comprising coupling a resistive device to the capacitive device.*

*38. The method of claim 37, wherein said developing a ripple voltage indicative of ripple current through the output inductor comprises: sensing ripple current through the output inductor; and converting sensed current into the ripple voltage.*

* * * * *